United States Patent
Jayaraman et al.

(10) Patent No.: US 12,449,985 B2
(45) Date of Patent: Oct. 21, 2025

(54) DYNAMIC FLASH INTERFACE MODULE (FIM) OPTIMIZATION

(71) Applicant: SANDISK TECHNOLOGIES, INC., Milpitas, CA (US)

(72) Inventors: Muralitharan Jayaraman, Bangalore (IN); Ramanathan Muthiah, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 9 days.

(21) Appl. No.: 18/390,325

(22) Filed: Dec. 20, 2023

(65) Prior Publication Data

US 2025/0208771 A1 Jun. 26, 2025

(51) Int. Cl.
*G06F 3/06* (2006.01)

(52) U.S. Cl.
CPC .......... *G06F 3/0625* (2013.01); *G06F 3/0634* (2013.01); *G06F 3/0679* (2013.01)

(58) Field of Classification Search
CPC ..... G06F 3/0625; G06F 3/0634; G06F 3/0679
See application file for complete search history.

(56) References Cited

U.S. PATENT DOCUMENTS

| | | | |
|---|---|---|---|
| 8,694,719 B2 | 4/2014 | Lassa | |
| 10,146,292 B2 | 12/2018 | Bahirat | |
| 11,442,665 B2 | 9/2022 | Balakrishnan | |
| 2020/0183622 A1 | 6/2020 | Hubbard | |
| 2020/0210108 A1* | 7/2020 | Palmer | G06F 3/0679 |
| 2021/0303484 A1* | 9/2021 | Vaysman | G06F 13/4282 |
| 2022/0334769 A1 | 10/2022 | Kim | |
| 2022/0357862 A1* | 11/2022 | Basu | G06F 3/0604 |
| 2023/0384977 A1* | 11/2023 | Park | G06F 3/061 |
| 2024/0256160 A1* | 8/2024 | Shin | G06F 3/061 |

* cited by examiner

*Primary Examiner* — Curtis James Kortman
(74) *Attorney, Agent, or Firm* — Arlene Neal; NEAL BLIBO LLC

(57) ABSTRACT

A storage device executes an adaptive flash interface module (FIM) protocol to optimize power consumption. The storage device includes a memory device including sets of dies and a set of FIMs. A FIM connects a controller to a set of dies on the memory device. The controller determines the mode of operation of the storage device and initializes the storage device in a first operating mode or a second operating mode. The controller makes at least one FIM non-operational when operating in the second operating mode and uses an operational FIM to communicate with multiple sets of dies on the memory device. The controller also makes a given number of FIMs operational when operating in the first operating mode and uses the operational FIM to communicate with a set of dies on the memory device. Operational FIMs accommodate a data rate for the mode of operation of the storage device.

18 Claims, 6 Drawing Sheets

DYNAMIC FLASH INTERFACE MODULE (FIM) OPTIMIZATION

BACKGROUND

A storage device may be communicatively coupled to a host and to non-volatile memory including, for example, a NAND flash memory device on which the storage device may store data received from the host. The memory device may be divided into physical blocks which may be grouped together into a plane. A die in the memory device may include a single plane full of data blocks or multiple planes that have been linked together. The number and configurations of planes within a flash die may be adaptable. A storage device may include one or more flash interface modules (FIMs), i.e., a bus/channel that connects a controller on the storage device to a set of dies on the memory device.

During design of a storage device architecture, the number of dies to be included in the storage device may be calculated based on the capacity requirements, and the number of FIMs may be determined based on the number of dies and/or performance requirement in the storage device. For example, if the storage device includes eight dies, the storage device may be designed to include two FIMs, wherein FIM0 may connect the controller to a first set of four dies and FIM1 may connect the controller to a second set of four dies. In another example, there could be one FIM (i.e., FIM0) for connecting the controller to the eight dies, but a single FIM could be a bottleneck to performance. Using the examples provided, FIM0 and FIM1 or FIM0 alone may thus take care of all of the data transfers between the associated set of dies and the controller.

The host may budget the amount of power it may supply to the storage device and the storage device may have a ceiling on the amount of power it may consume. The storage device may also operate within a predefined thermal range. When the storage device is consuming power near its power ceiling or operating outside of the predefined thermal range, the controller may lower the clock frequency and operate at a slower rate and the storage device may avoid power loss from linear and low drop regulators. For instance, the controller may reduce the rate at which it is communicating with the FIMs and the toggle mode frequency (i.e., the data rate at which FIM channels are operated to transfer data between the FIM and the controller). At such a reduced rate, the controller may spend more time performing host operations, such as read and write operations, than it would if it were operating at normal speed.

Some storage devices may be multi-protocol devices, i.e., these devices may use multiple protocols to communicate with the host. The multi-protocol storage device may communicate with the host in different modes, one of which may be a lower performance mode and the other may be a higher performance mode. In one example, a multi-protocol storage device may communicate with the host using a Secure Digital (SD) protocol and a Non-Volatile Memory Express (NVMe) protocol. In another example, a multi-protocol storage device may communicate with the host using a Universal Serial Bus (USB) protocol and the NVMe protocol. When the storage device of a certain size (for example, a storage device having a small form factor) operates in a higher performance mode, the storage device may become heated and may operate outside of the predefined thermal range because there may not be sufficient physical space to cause the thermal impact to dissipate.

There may also be power limits for each protocol being used by the storage device. For example, there may be a 4-Watt (W) power limit in the NVMe mode and 360-milliwatt (mW) power limit in the SD mode. In a storage device that includes, for example, four FIM channels to meet the performance requirements of the higher performance mode (for example, the NVMe mode), the power limit in the SD mode may not be possible due to four FIM channels in the storage device. However, without the four FIM channels, it may not be possible for the storage device to meet the performance of the NVMe mode. A protocol is thus needed to optimize power consumption on a storage device.

SUMMARY

In some implementations, the storage device may execute an adaptive flash interface module (FIM) protocol to optimize power consumption. The storage device includes a memory device including sets of dies and a set of FIMs. A FIM may connect a controller to a set of dies on the memory device. The storage device also includes a controller to determine a mode of operation of the storage device and initialize the storage device in a first operating mode or a second operating mode. The controller makes at least one FIM non-operational when operating in the second operating mode and uses an operational FIM to communicate with multiple sets of dies on the memory device and accommodate a data rate for the second mode of operation. The controller also makes a given number of FIMs operational when operating in the first operating mode and uses the operational FIM to communicate with a set of dies on the memory device and accommodate a data rate for the first mode of operation.

In some implementations, each FIM connects a controller to a set of dies on the memory device. The controller enables or disables a given number of FIMs according to an operating condition on the storage device.

In some implementations, a method is provided for executing an adaptive FIM protocol to optimize power consumption in a storage device that includes a controller to execute the method. The method includes determining a mode of operation of the storage device and initializing the storage device in a first operating mode or a second operating mode. The method also includes making at least one FIM non-operational when operating in the second operating mode and using an operational FIM to communicate with multiple sets of dies on a memory device and accommodate a data rate for the second mode of operation. The method also includes making a given number of FIMs operational when operating in the first operating mode, using the operational FIM to communicate with a set of dies on the memory device and accommodate a data rate for the first mode of operation.

Figure 1:
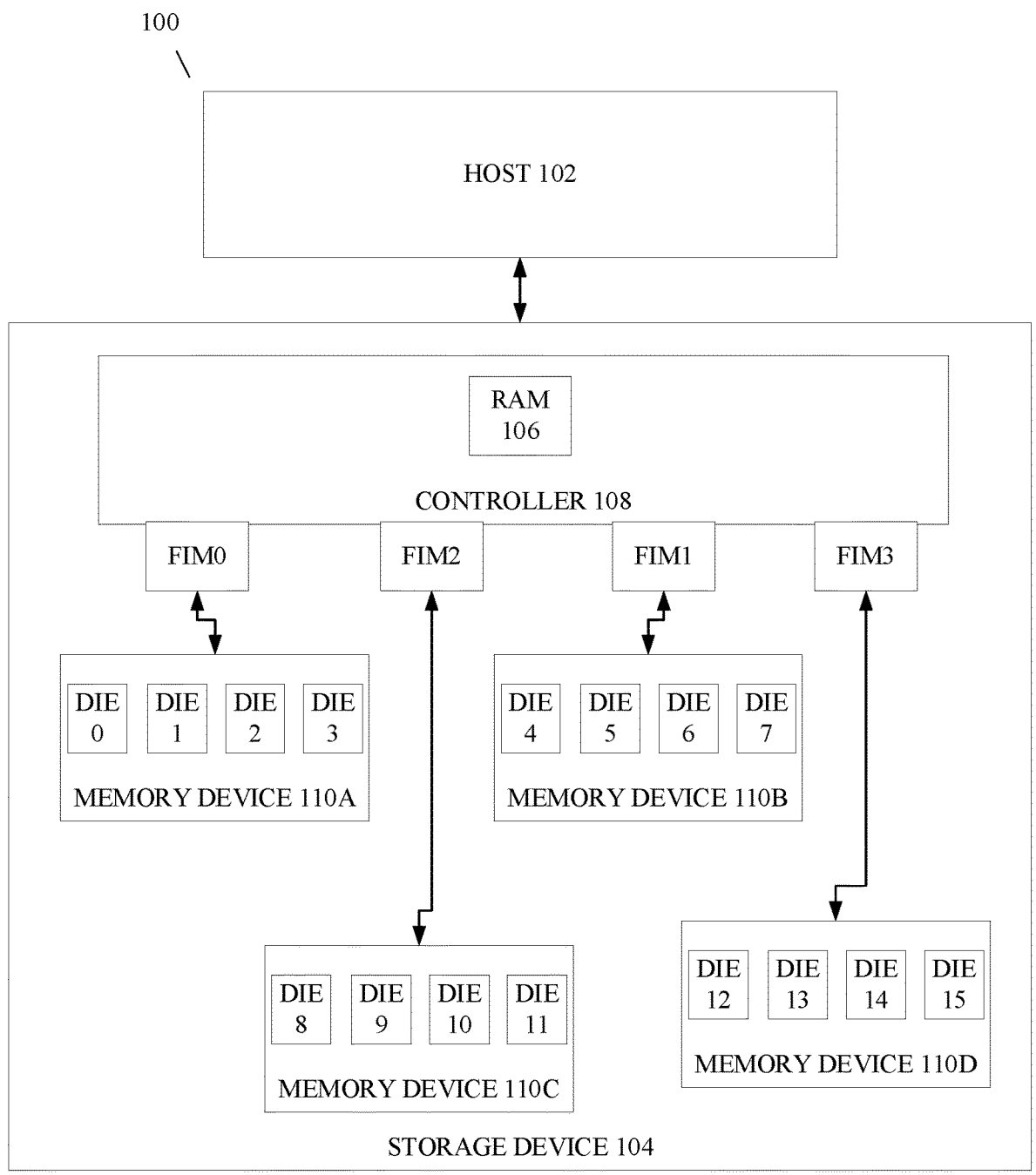
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 and storage device 104 may be in the same physical location as components on a single computing device or on different computing devices that are communicatively coupled. Storage device 104, in various embodiments, may be disposed in one or more different locations relative to the host 102. System 100 may include additional components (not shown in this figure for the sake of simplicity).

Storage device 104 may include a random-access memory (RAM) 106, a controller 108, and one or more non-volatile memory devices 110a-110d (referred to herein as the memory device(s) 110). Storage device 104 may be, for example, a solid-state drive (SSD), and the like. RAM 106 may be temporary storage such as a dynamic RAM (DRAM) that may be used to cache information in storage device 104.

Controller 108 may interface with host 102 and process foreground operations including instructions transmitted from host 102. For example, controller 108 may read data from and/or write to memory device 110 based on instructions received from host 102. Controller 108 may further execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based. For example, memory device 110 may be a NAND flash memory that may be used for storing host and control data over the operational life of memory device 110. Memory device 110 may be included in storage device 104 or may be otherwise communicatively coupled to storage device 104. Memory device 110 may include dies 0-15 and controller 108 may access a set of dies through a flash interface module (FIM), for example, FIM0-FIM3. Each of FIM0-FIM3 is a bus/channel that connects controller 108 to a set of dies on memory device 110. For example, FIM0 may connect controller 108 to die 0-die 3, FIM1 may connect controller 108 to die 4-die 7, FIM2 may connect controller 108 to die 8-die 11, and FIM3 may connect controller 108 to die 12-die 15.

Storage device 104 may be a multi-protocol storage device that may operate in two or more modes, wherein the first operating mode may be a higher performance mode than the second operating mode. For example, storage device 104 may communicate with host 102 using a Non-Volatile Memory Express (NVMe) protocol (i.e., the first operating mode) or Secure Digital (SD) protocol (i.e., the second operating mode). In another example, storage device 104 may communicate with the host 102 using the NVMe protocol (i.e., the first operating mode) or a Universal Serial Bus (USB) protocol (i.e., the second operating mode).

Controller 108 may adapt the use of FIM0-FIM3 according to the mode in which storage device 104 is operating. When storage device 104 is initialized with a particular mode of operation, a flash translation layer may pre-calculate the FIM channel requirement. In an example, the flash translation layer in controller 108 may pre-calculate the FIM channel requirement based on a known ceiling data rate for the mode of operation for which storage device 104 is being initialized. Based on the pre-calculated FIM channel requirement, controller 108 may use (enable) all or some of the FIMs in the first operating mode and controller 108 may switch off (disable) one or more FIMs when operating in the second operating mode. When controller 108 switches off one or more FIMs, controller 108 may control the FIMs that are operational (i.e., those FIMs that are not switched off) so that controller 108 may use the operational FIMs to communicate with all of the dies on memory device 110. For instance, controller may use a multiplexer configuration and may chip enable (CE) a memory device 110 by sending a signal that may be required to on a memory chip so that it is available for access.

In some cases, when host 102 sets up storage device 104 for a specific power or thermal mode, controller 108 may re-initialize the FIM configuration with a reduced number of FIM channels to support power savings and reduce thermal impact. The re-initialization of the FIM configuration to support power savings and/or reduce thermal impact may be applied to multi-protocol storage devices and to situations where controller 108 may apply different thresholds for different modes of operations. In an example where a maximum of eight FIMs can be supported by storage device 104, during power saving mode, controller 108 may reinitialize the FIM configuration to use four FIMs in the first operating mode and two FIMs in the second operating mode. Controller 108 may use the multiplexer configuration when one or more FIM channels are switched off (i.e., made non-operational) to accommodate the data rate of the mode of operation in which storage device 104 is being initialized, without impacting the quality of service and while saving on power.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
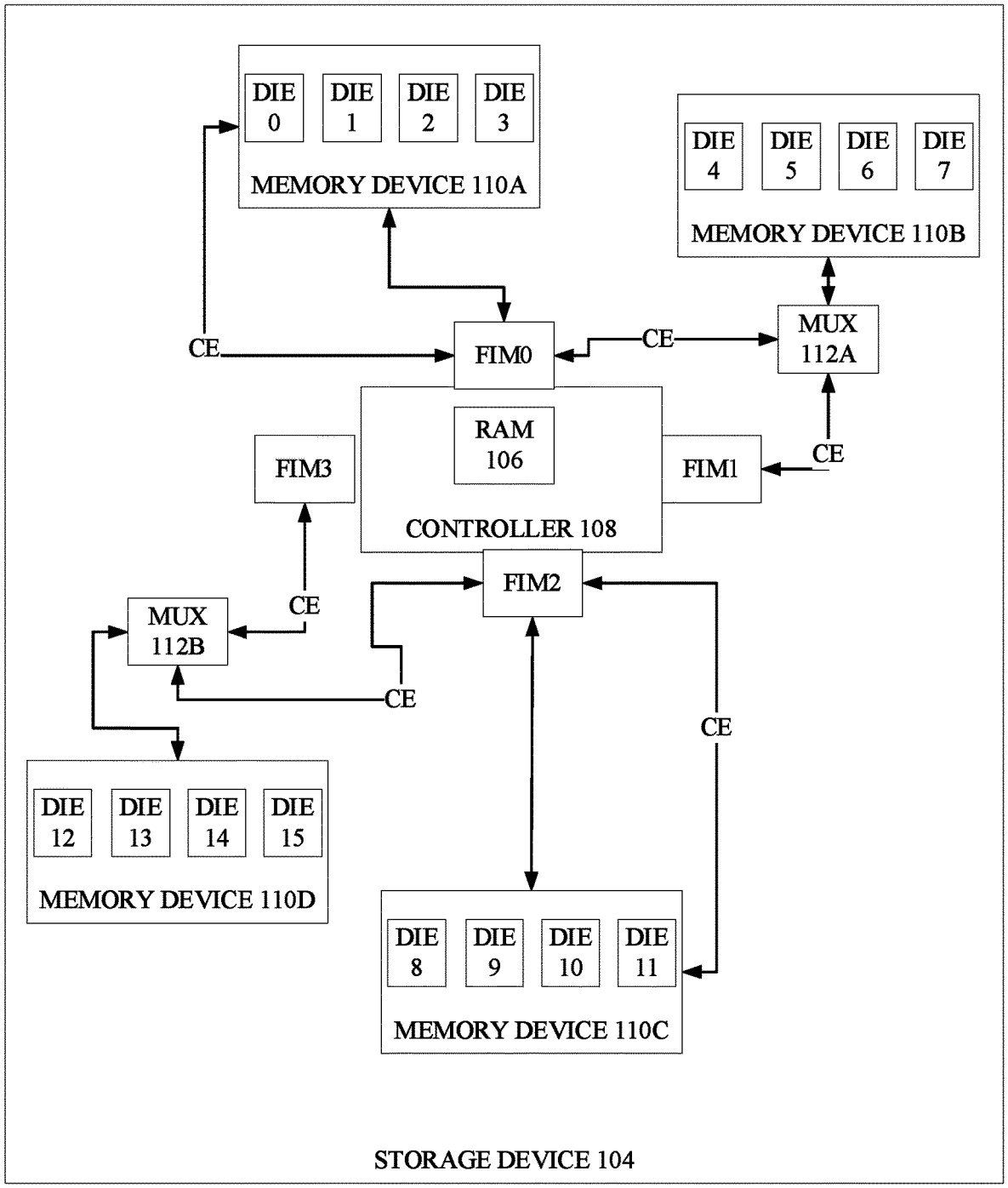
FIG. 2 is a block diagram of a storage device in accordance with some implementations.

FIG. 2 is a block diagram of a storage device in accordance with some implementations. Host 102 may determine the operating mode of storage device 104. When host 102 switches storage device 104 from the first operating mode to the second operating mode or vice versa, controller 108 may trigger one or more multiplexers (shown as MUX 112a and 112b and also referred to herein as MUX 112) to correspond with the operating mode. Controller may trigger MUX 112 during initialization of storage device 104, during initialization of the flash translation layer or at any other logical point. When switching from the first operating mode to the second operating mode, controller 108 may reduce the number of FIMs participating in data transfers between controller 108 and the dies 0-15 in memory device 110. For example, when switching from the first operating mode to the second operating mode, controller 108 may switch off FIM0 and FIM 2 (referred to herein as the non-operational FIM(s)) and may trigger MUX 112. By triggering MUX 112a, controller 108 may interface with memory device 110a and 110b through operational FIM1. Similarly, controller 108 may interface with memory device 110c and 110d through operational FIM3. As such, in the first operating mode, each of FIM 0-3 will enable controller 108 to communicate with one set of dies in memory device 110 and in the second operating mode, each operational FIM will enable controller 108 to communicate to multiple sets of dies in memory devices 110. In the second operation mode, the connections between controller 108 and dies 0-15 may be controlled by MUX 112 and CE operations. The reduction in the number of operational FIMs participating in data transfers in the second operating mode may not hinder storage device 104 performance, since the performance requirement in the second operating mode may be significantly less than the performance requirement in the first operating mode.

In an example where storage device switches from the second operating mode to the first operating mode, controller 108 may switch on all of the FIMs, i.e., controller 108 may switch on FIM0-FIM3. As such, controller 108 may interface with memory device 110a through FIM0, interface with memory device 110b through FIM1, interface with memory device 110c through FIM2, and interface with memory device 110d through FIM3. In the first operation mode, controller 108 may communicate with a set of dies through an operational FIM, as opposed to communicating with multiple sets of dies through an operational FIM as is the case in the second operating mode.

The controller may enable or disable a given number of FIMs according to the operating condition on storage device 104. For instance, controller 108 may apply the mode adaptive FIM protocol during idle time background operations such as idle time garbage collection, wherein controller 108 may enable/disable a given number of FIMs consistent with the power requirements of storage device 104 during idle time conditions. Controller 108 may apply the mode adaptive FIM protocol during idle time background operations irrespective of the operating mode of storage device 104. Hence, the mode adaptive FIM protocol may be applicable to single-protocol storage devices and multi-protocol storage devices. The mode adaptive FIM protocol may be further modified based on the working mode of operation when the idle time garbage collection is triggered in the storage device 104. For example, controller 108 may reduce the participating FIM count during the idle time garbage collection below the normal FIM count in each of the mode of operation.

Controller 108 may also apply the mode adaptive FIM protocol in a non-multi-protocol device, wherein based on performance requirements, the controller may enable/disable one or more FIMs and use MUX 112 configuration to reach dies 0-15 in memory device 110. For example, based on the data rate of the streams (i.e., the sum of rate of the streams) that it is servicing, controller 108 may flexibly enable/disable one or more FIMs consistent with a data rate requirement. In another example, controller 108 may include firmware logic to dynamically determine the memory interface rate with the underlying memory device 110 and the flash translation layer. At logical points, controller 108 may choose a reduced number of required FIMs to accommodate the memory interface rate, rather than using all the FIMs on storage device 104.

Controller 108 may additionally dynamically configure the number of operational FIM channels at a given time based on host side information/hints available in storage device 104. For example, based on burst mode information from host 102, controller 108 may dynamically configure the number of operational FIM channels at a given time. Controller 108 may use the host hint to dynamically configure the number of operational FIM channels in a single-protocol environment and/or in a multi-protocol environment. Controller 108 may also use a determined host interface speed to dynamically determine the number of FIM channels that needs to be operational for optimal resource usage and power management. For example, when using a current protocol (for example, peripheral component interconnect express (PCI Express or PCIe) Gen 4), controller 108 may use the full set of FIM channels, whereas controller 108 may use a reduced and sufficient number of FIM channels for an earlier version of the protocol (for example, PCIe Gen 3) if controller 108 determines that the memory interface may not be a bottleneck. FIG. 2 is provided as an example. Other examples may differ from what is described in FIG. 2.

Figure 3:
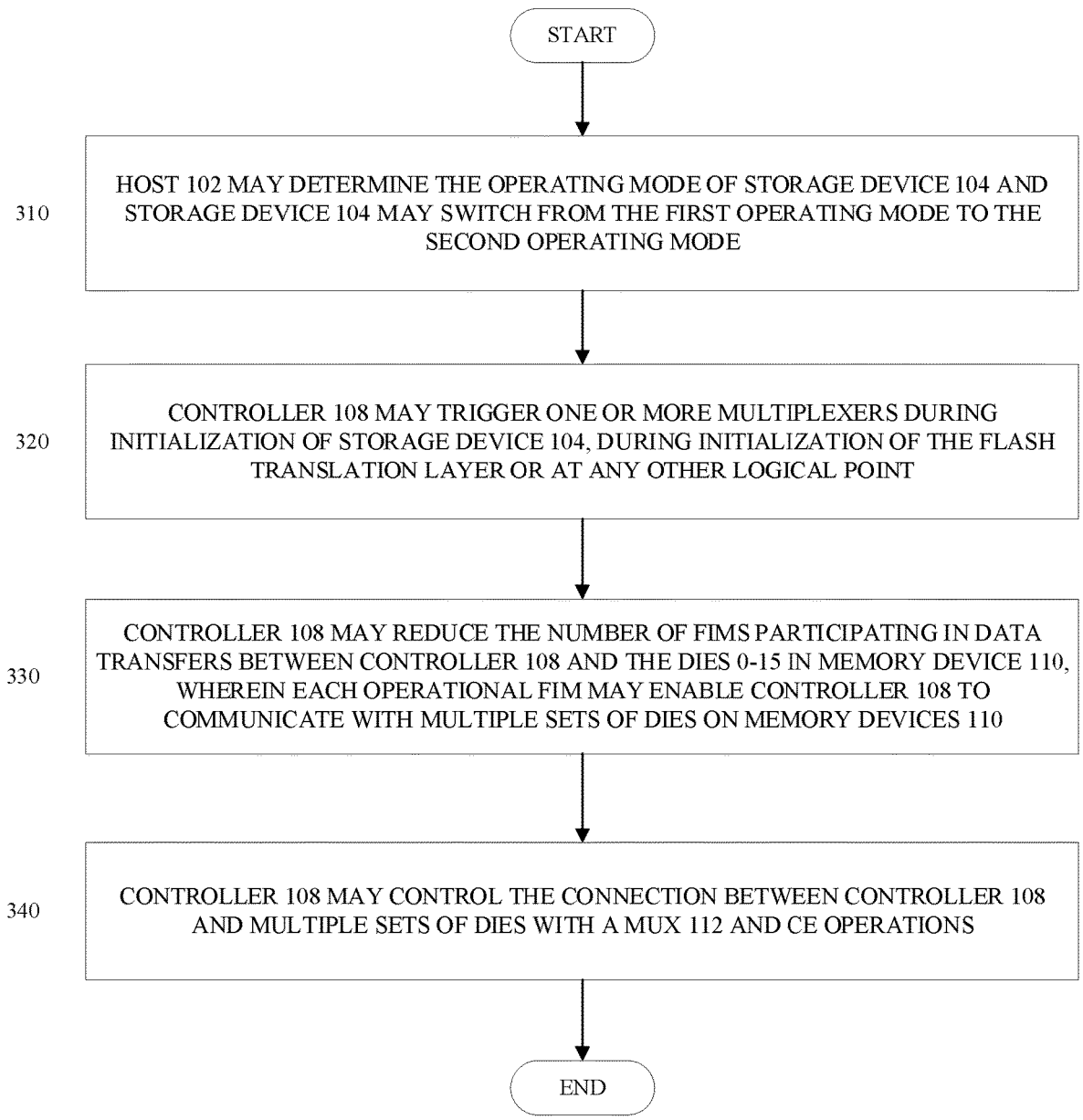
FIG. 3 is an example flow diagram for dynamically configuring the FIMs on a storage device when the storage device switches from the first operating mode to a second operating mode in accordance with some implementations.

FIG. 3 is an example flow diagram for dynamically configuring the FIMs on a storage device when the storage device switches from the first operating mode to a second operating mode in accordance with some implementations. At 310, host 102 may determine the operating mode of storage device 104 and storage device 104 may switch from the first operating mode to the second operating mode. At 320, controller 108 may trigger one or more multiplexers during initialization of storage device 104, during initialization of the flash translation layer or at any other logical point. At 330, controller 108 may reduce the number of FIMs participating in data transfers between controller 108 and the dies 0-15 in memory device 110, wherein each operational FIM may enable controller 108 to communicate with multiple sets of dies on memory devices 110. At 340, controller 108 may control the connection between controller 108 and multiple sets of dies with a MUX 112 and CE operations. FIG. 3 is provided as an example. Other examples may differ from what is described in FIG. 3.

Figure 4:
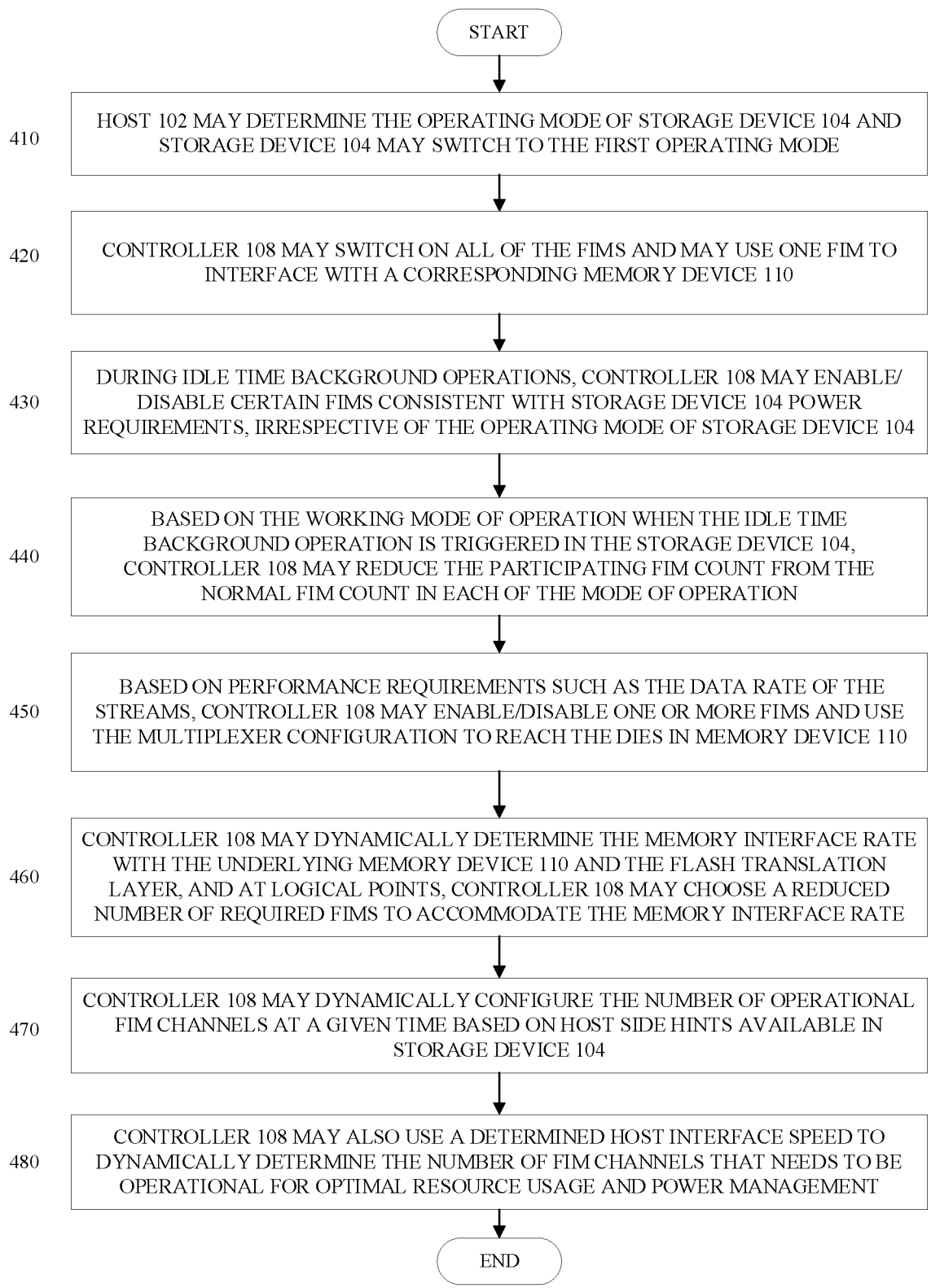
FIG. 4 is an example flow diagram for executing a mode adaptive FIM protocol in accordance with some implementations.

FIG. 4 is an example flow diagram for executing a mode adaptive FIM protocol in accordance with some implementations. At 410, host 102 may determine the operating mode of storage device 104 and storage device 104 may switch to the first operating mode. At 420, controller 108 may switch on all of the FIMs and may use one FIM to interface with a corresponding memory device 110. At 430, during idle time background operations, controller 108 may enable/disable certain FIMs consistent with storage device 104 power requirements, irrespective of the operating mode of storage device 104. At 440, based on the working mode of operation when the idle time background operation is triggered in the storage device 104, controller 108 may reduce the participating FIM count from the normal FIM count in each of the mode of operation. At 450, based on performance requirements such as the data rate of the streams, controller 108 may enable/disable one or more FIMs and use the multiplexer configuration to reach the dies in memory device 110. At 460, controller 108 may dynamically determine the memory interface rate with the underlying memory device 110 and the flash translation layer, and at logical points, controller 108 may choose a reduced number of required FIMs to accommodate the memory interface rate. At 470, controller 108 may dynamically configure the number of operational FIM channels at a given time based on host side hints available in storage device 104. At 480, controller 108 may also use a determined host interface speed to dynamically determine the number of FIM channels that needs to be operational for optimal resource usage and power management. FIG. 4 is provided as an example. Other examples may differ from what is described in FIG. 4.

Figure 5:
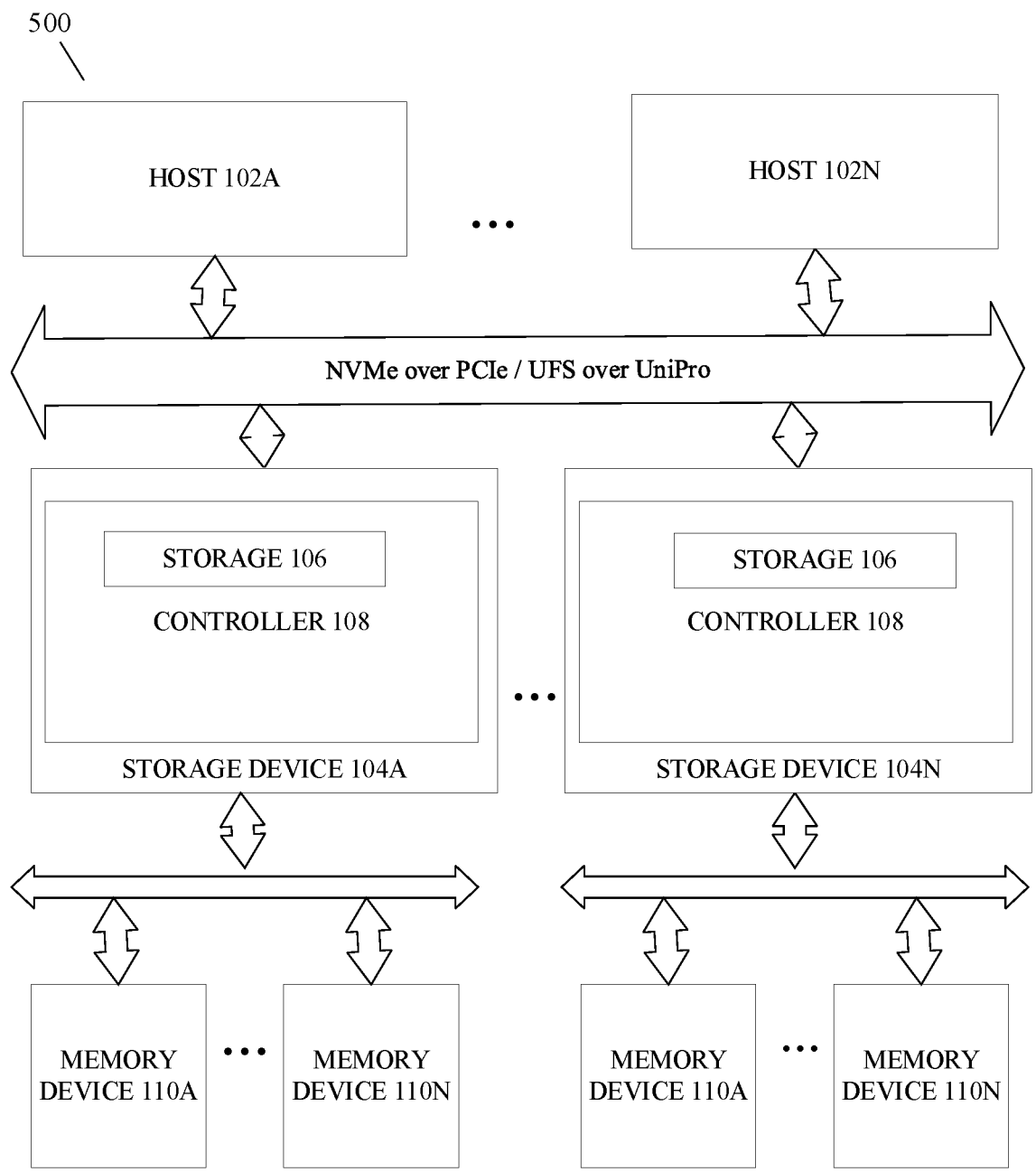
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102*n* (referred to herein as host(s) 102), and storage devices 104*a*-104*n* (referred to herein as storage device(s) 104).

Storage device 104 may include a controller 108 to dynamically configure the number of FIMs used on storage device 104. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 500 may interconnect via wired connections, wireless connections, or a combination of wired and wireless connections. For example, the network of FIG. 5 may include a cellular network (e.g., a long-term evolution (LTE) network, a code division multiple access (CDMA) network, a 3G network, a 4G network, a 4G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
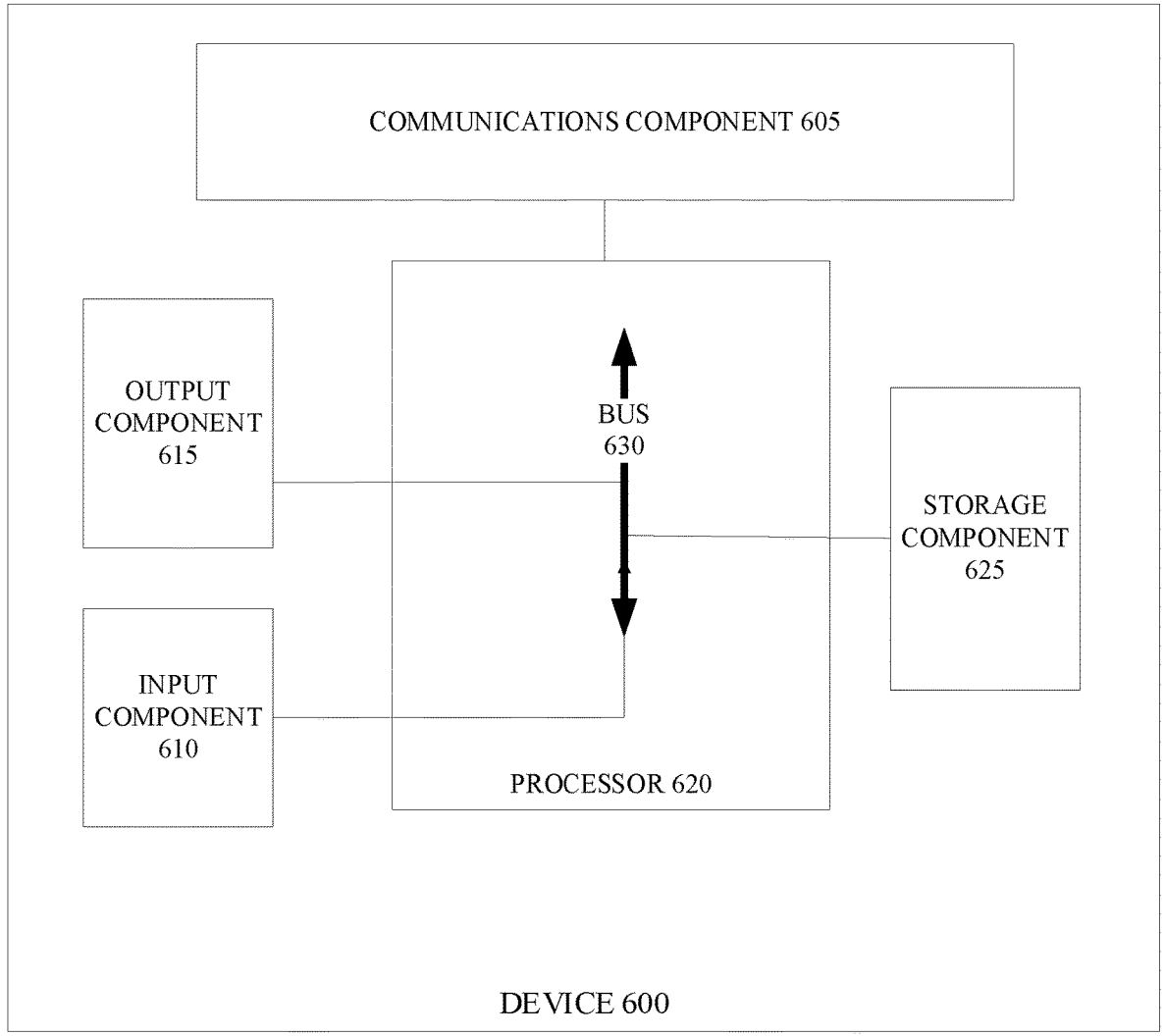
FIG. 6 is a diagram of example components of the host of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone, and/or a display screen), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM) 106, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to execute an adaptive flash interface module (FIM) protocol to optimize power consumption, the storage device comprising:
   a memory device including sets of dies;
   a set of FIMs, wherein a FIM connects a controller to a set of dies on the memory device; and
   the controller to:
   determine a mode of operation of the storage device,
   initialize the storage device in one of a first operating mode and a second operating mode,
   make at least one FIM non-operational when operating in the second operating mode,
   use an operational FIM in the second mode to communicate with multiple sets of dies on the memory device and accommodate a data rate for the second mode of operation, and
   make a given number of FIMs operational when operating in the first operating mode, use the given number of operational FIMs to communicate with a set of dies on the memory device and accommodate a data rate for the first mode of operation,
   wherein in the second mode of operation the controller triggers on a multiplexer to control a first FIM that is operational to communicate with a first set of dies connected to a second FIM that is non-operational and to also communicate with a second set of dies connected to the first FIM.

2. The storage device of claim 1, wherein during initialization of the storage device, the controller calculates a FIM requirement for the mode of operation in which the storage device is being initialized, and based on the FIM requirement, the controller uses a subset of the FIMs in the first operating mode.

3. The storage device of claim 1, wherein the controller re-initializes a FIM configuration to include a reduced number of FIMs to at least one of support power savings and reduce thermal impact, wherein the controller applies different thresholds to different modes of operation.

4. The storage device of claim 1, wherein when the controller switches the storage device from one mode of operation to another mode of operation, the controller triggers at least one multiplexer to correspond with an operating mode.

5. The storage device of claim 1, wherein in the first operating mode, an operational FIM from the given number of operational FIMs enables the controller to communicate with one set of dies in the memory device, and in the second operating mode, the operational FIM enables the controller to communicate to multiple sets of dies in the memory devices, wherein a connection between the controller and the FIMs in the second operating mode is controlled by a multiplexer and chip enabled operations.

6. The storage device of claim 1, wherein the controller reduces a participating FIM count during idle time background operations below a FIM count in each of the modes of operation.

7. The storage device of claim 1, wherein the controller uses at least one of a host hint and a determined host interface speed to dynamically configure a number of operational FIMs.

8. The storage device of claim 1, wherein irrespective of the operating mode of the storage device, the controller one of enables and disables a given number of FIMs according to an operating condition on the storage device.

9. A storage device to execute an adaptive flash interface module (FIM) protocol to optimize power consumption, the storage device comprising:
 a memory device including sets of dies;
 a set of FIMs, wherein each FIM connects a controller to a set of dies on the memory device; and
 the controller, wherein the controller is configured to one of enable and disable a given number of FIMs according to an operating condition on the storage device,
 wherein in a mode of operation the controller makes at least one FIM non-operational and triggers on a multiplexer to control a first FIM that is operational to communicate with a first set of dies connected to a second FIM that is non-operational and to also communicate with a second set of dies connected to the first FIM.

10. The storage device of claim 9, wherein the controller one of enables and disables at least one FIM based on performance requirements and uses a multiplexer configuration to reach the set of dies on the memory device.

11. The storage device of claim 9, wherein the controller uses at least one of a host hint and a determined host interface speed to dynamically configure a number of operational FIMs.

12. A method for executing an adaptive flash interface module (FIM) protocol to optimize power consumption in a storage device, wherein the storage device comprises a controller to execute the method, the method comprising:
 determining a mode of operation of the storage device;
 initializing the storage device in one of a first operating mode and a second operating mode;
 making at least one FIM non-operational when operating in the second operating mode, using FIMs that are operational in the second mode of operation to communicate with multiple sets of dies on a memory device and accommodate a data rate for the second mode of operation;
 making a given number of FIMs operational when operating in the first operating mode, using an operational FIM to communicate with a set of dies on the memory device and accommodate a data rate for the first mode of operation and and
 in the second mode of operation, triggering a multiplexer to control a first FIM that is operational to communicate with a first set of dies connected to a second FIM that is non-operational and to also communicate with a second set of dies connected to the first FIM.

13. The method of claim 12, wherein initializing comprises calculating a FIM requirement for a mode of operation in which the storage device is being initialized and using a subset of the FIMs on the storage device in the first operating mode.

14. The method of claim 12, further comprising re-initializing a FIM configuration to include a reduced number of FIMs to at least one of support power savings and reduce thermal impact, the method further includes applying different thresholds to different modes of operation.

15. The method of claim 12, wherein when switching the storage device from one mode of operation to another mode of operation, the method comprises triggering at least one multiplexer to correspond with an operating mode.

16. The method of claim 12, wherein in the first operating mode, the method comprises using an operational FIM in the given number of operational FIMs to communicate with one set of dies in the memory device, and in the second operating mode, the method comprises using the operational FIM to communicate to multiple sets of dies in the memory devices.

17. The method of claim 12, further comprising reducing a participating FIM count during idle time background operations below a FIM count in each of the modes of operation.

18. The method of claim 12, further comprising using at least one of a host hint and a determined host interface speed to dynamically configure a number of operational FIMs.

* * * * *